US012574809B2

(12) United States Patent
Olvera-Hernandez et al.

(10) Patent No.: US 12,574,809 B2
(45) Date of Patent: Mar. 10, 2026

(54) SERVICE CONTINUITY DURING AN APPLICATION CONTEXT RELOCATION PROCEDURE

(71) Applicant: InterDigital Patent Holdings, Inc., Wilmington, DE (US)

(72) Inventors: Ulises Olvera-Hernandez, Saint-Lazare (CA); Michel Roy, Candiac (CA); Robert Gazda, Spring City, PA (US); Scott Hergenhan, Collegeville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 346 days.

(21) Appl. No.: 18/283,979

(22) PCT Filed: Apr. 5, 2022

(86) PCT No.: PCT/US2022/023533
§ 371 (c)(1),
(2) Date: Sep. 25, 2023

(87) PCT Pub. No.: WO2022/216740
PCT Pub. Date: Oct. 13, 2022

(65) Prior Publication Data
US 2024/0163736 A1    May 16, 2024

Related U.S. Application Data

(60) Provisional application No. 63/170,866, filed on Apr. 5, 2021.

(51) Int. Cl.
*H04W 36/00*          (2009.01)
*H04W 76/15*          (2018.01)

(52) U.S. Cl.
CPC ....... *H04W 36/0033* (2013.01); *H04W 76/15* (2018.02)

(58) Field of Classification Search
CPC .................................................. H04W 36/0033
See application file for complete search history.

(56) References Cited

U.S. PATENT DOCUMENTS

| | | | |
|---|---|---|---|
| 2019/0007500 A1* | 1/2019 | Kim ..................... | H04L 67/141 |
| 2021/0084569 A1 | 3/2021 | Kim et al. | |
| 2021/0307101 A1 | 9/2021 | Kim et al. | |

FOREIGN PATENT DOCUMENTS

| | | |
|---|---|---|
| WO | WO 2019/194954 A1 | 10/2019 |
| WO | WO 2020/013468 A1 | 1/2020 |
| WO | WO 2022/035214 A1 | 2/2022 |

OTHER PUBLICATIONS

Third Generation Partnership Project (3GPP), "Study on application architecture for enabling Edge Applications", (Release 17), 3GPP TR 23.758 V0.3.0, Jul. 2019, 42 pages.

(Continued)

*Primary Examiner* — Pamit Kaur
(74) *Attorney, Agent, or Firm* — Flaster Greenberg P.C.

(57) ABSTRACT

The disclosure pertains to a method implemented in a Wireless Transmit/Receive Unit (WTRU) for service continuity during an application context relocation (ACR) procedure. The method includes determining, by the WTRU, one or more local area data network (LADN) data network names (DNNs) that require service continuity. The method additionally includes indicating, to a network by the WTRU, the LADN DNNs that require service continuity. The network is configured to use the list to maintain a protocol data unit (PDU) session toward a source LADN DNN, after the WTRU leaves a service area of a source LADN, while ACR is being executed and release the PDU session when the ACR is complete.

20 Claims, 11 Drawing Sheets

(56)  References Cited

OTHER PUBLICATIONS

Third Generation Partnership Project (3GPP), "System Architecture for the 5G System (5GS)", Stage 2, (Release 16), 3GPP TS 23.501 V16.2.0, Sep. 2019, 391 pages.

Third Generation Partnership Project (3GPP), "Procedures for the 5G System (5GS)", Stage 2, (Release 16), 3GPP TS 23.502 V16.2.0, Sep. 2019, 525 pages.

Third Generation Partnership Project (3GPP), "Policy and Charging Control Framework for the 5G System (5GS)", Stage 2, (Release 16), 3GPP TS 23.503 V16.2.0, Sep. 2019, 104 pages.

Third Generation Partnership Project (3GPP), "Architecture for enabling Edge Applications", (Release 17), 3GPP TS 23.558 V2.0.0, Mar. 2021, 141 pages.

Third Generation Partnership Project (3GPP), "Terms and abbreviations for service continuity", Samsung, 3GPP TSG-SA WG6 Meeting #42-e, S6-210633, e-meeting, Mar. 1-9, 2021, 30 pages.

Third Generation Partnership Project (3GPP), "Solution for the KI#2: PSA relocation with support of service continuity or not", Lenovo, Motorola Mobility, 3GPP TSG-SA2 Meeting #136AH, S2-2000678, Jan. 13-17, 2020, Incheon, KR, 5 pages.

* cited by examiner

SERVICE CONTINUITY DURING AN APPLICATION CONTEXT RELOCATION PROCEDURE

CROSS-REFERENCE TO RELATED APPLICATION(S)

This application is the 371 National Stage of International Application No. PCT/US2022/023533, filed Apr. 5, 2022, which claims the benefit of U.S. Provisional Patent Application No. 63/170,866, filed Apr. 5, 2021, the contents of which are incorporated by reference herein in their entirety.

TECHNICAL FIELD

The present disclosure generally relates to methods and apparatuses for performing wireless communications. For example, systems and methods are disclosed for maintaining service continuity when moving across service areas during an application context relocation procedure.

BACKGROUND

In 5G NR core networks (5GCNs) and other wireless communication data networks, Local Area Data Networks (LADNs) may be implemented in the core network in order to enable one or more wireless transmit/receive units (WTRUs) to access a specific data network. For example, a LADN may enable access to one or more data networks (DNs) via protocol data unit (PDU) sessions established using data network names (DNNs) associated with the DNs. LADNs may be configured to restrict access to certain services or DNNs to certain geographical areas or service areas. For example, the service areas may comprise on one or more Tracking Areas (TAs). However, such restrictions based on service area may lead to issues for WTRUs that are mobile and may move between various services areas associated with various LADNs.

SUMMARY

Communications techniques and procedures are proposed to enable service continuity for a WTRU that moves across service areas corresponding to different DNNs during an Application Context Relocation (ACR) procedure. For example, service continuity may be achieved by enabling a temporary re-activation and/or activation of PDU sessions associated with a local area data network (LADN) data network name (DNN) while an ACR procedure is in progress in response to the movement of a WTRU to a different DNN. After a specific period of time or after the ACR procedure has been completed, the WTRU may deactivate the previous PDU session associated with the previous LADN DNN and use a new PDU session. The new PDU session may be associated with a new LADN DNN for the service being used by the WTRU.

For example, a WTRU may comprise a processor and memory. The processor and memory may be configured to implement any of the functionality described herein as being done or performed by the WTRU. The WTRU may establish a first protocol data unit (PDU) session associated with at least a LADN DNN. The LADN DNN may be associated with a first service area. The WTRU may detect that the WTRU re-located to a second service area. The second service area may not be supported by the LADN DNN.

The WTRU may send a request to establish a second PDU session associated with a DNN. The request may be sent based on the WTRU determining that it has re-located from the first service area to the second service area. The DNN may be associated with the second service area. The request to establish the second PDU session may indicate that the first PDU session should remain active during an application context relocation (ACR) procedure. The ACR procedure may enable the DNN to be made aware of the WTRU session settings associated with the WTRUs access to the LADN DNN. The LADN DNN may be used by the WTRU for accessing a first service via the LADN DNN while in the first service area. Upon completion of the ACR, the DNN may be used by the WTRU for accessing the first service via the DNN while in the second service area.

After sending the request to establish the second PDU session, the WTRU may continue to utilize the first PDU session associated with the LADN DNN. The WTRU may continue to utilize the first PDU session associated with the LADN DNN even though access to the LADN DNN is supposed to be restricted to the first service area and/or is not supposed to be accessed while operating in the second service area. However, the WTRU may be allowed to use the first PDU session associated with the LADN DNN temporarily while in the second service areas based on an indication in the request to establish the second PDU session. The indication may indicate that service continuity is to be maintained while the second PDU session is being established for accessing the DNN via the DNN in the second service area. The temporary access may be for a predetermined or signaled amount of time. The temporary access may be maintained until the ACR procedure as been completed. The WTRU may receive an indication from the network the ACR procedure has been completed or may infer that the ACR was completed based on the network indicating that the first PDU session has been released or deactivated.

The WTRU may release or deactivate the first PDU session after the second PDU session has been established. The WTRU may utilize the second PDU session associated with the second LADN DNN after the first PDU session has been released.

In an embodiment, the DNN may be configured as an equivalent DNN to the first LADN DNN. The WTRU may be allowed temporary access to PDU sessions associated with a previous LADN DNN if its new LADN DNN is configured as an equivalent LADN DNN.

In an embodiment, the WTRU may perform a registration procedure. The WTRU may indicate a registration request message whether the DNN is equivalent to the LADN DNN. Example of characteristics that may indicate that different LADN DNNs may be considered equivalent DNNs may include one or more of delivery of the same service(s) to the WTRU, support of the same set of Edge Application Server(s) (EASs), that allows for temporary extension of the service area of the LADN DNN during the ACR procedure, and/or mapping to the same Application Function (AF) Service Identifier. The WTRU may provide information relating to the equivalent LADN DNNs or identification information associated to the equivalent LADN DNNs to a Session Management Function (SMF).

The WTRU may be configured to identify one or more Edge Enabled Servers (EESs) associated with the second service area. The EES(s) associated with the second service areas may be referred to as a target EES (T-EES). The WTRU may also identify one or more target EASs (T-EASs) based on the one or more T-EESs.

The WTRU may be configured to release or deactivate the first PDU session based on expiration of a timer. The WTRU may be configured to receive information indicating that the ACR procedure has been completed. The WTRU may release or deactivate the first PDU session based on receiving the information indication that the ACR procedure has been completed. The WTRU may release the first PDU session at a specific time based on information regarding ACR duration. WTRU may release the first PDU session based on whether there is traffic on the first PDU session. For example, the WTRU may release the first PDU session if there is no further traffic associated with the first PDU session.

In an embodiment, the WTRU may be configured to determine that the first PDU session associated with the first LADN DNNs requires service continuity based on an Edge Configuration Server (ECS) notification.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements, and wherein.

DETAILED DESCRIPTION OF EMBODIMENTS

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Figure 1A:
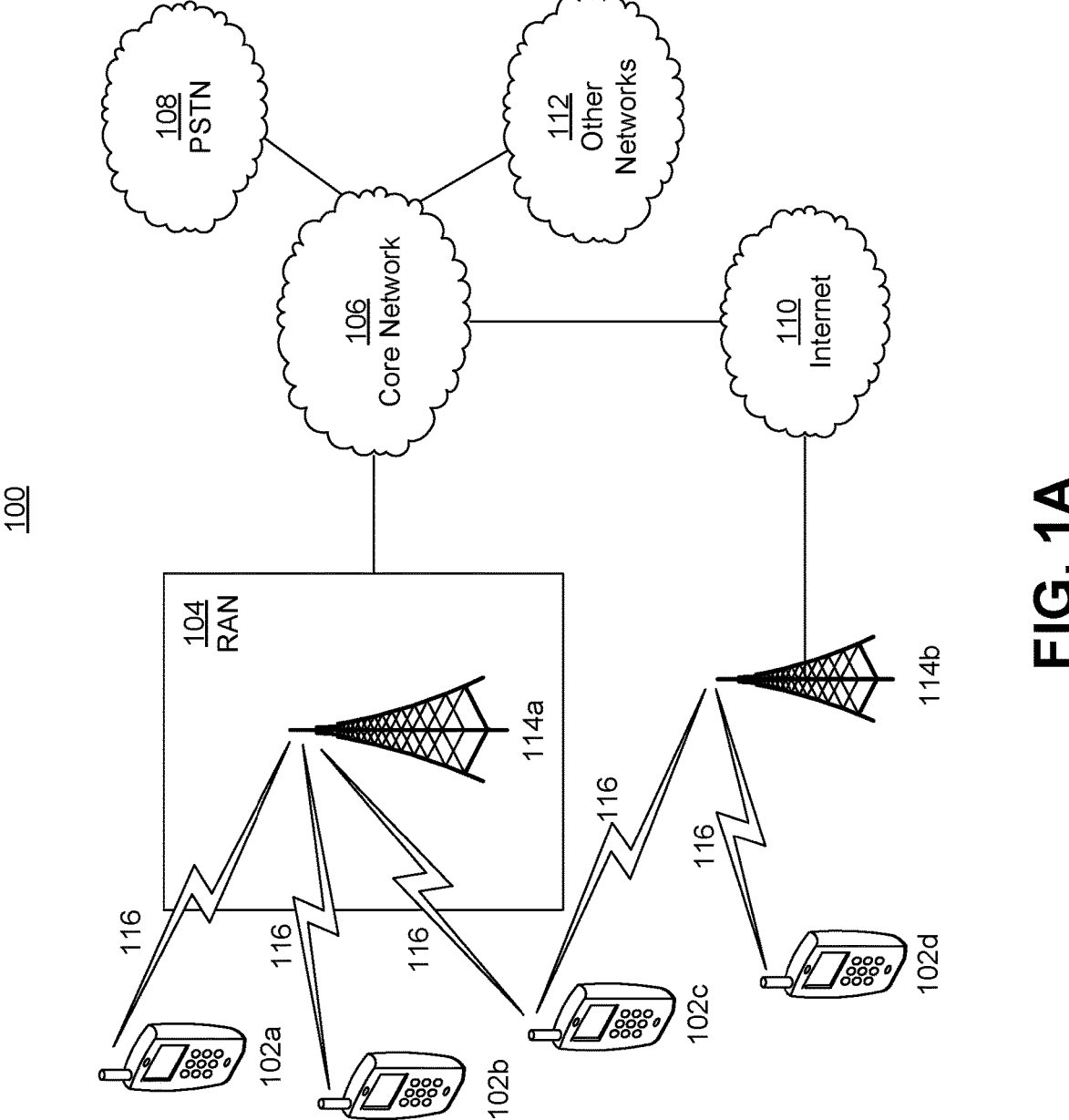
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
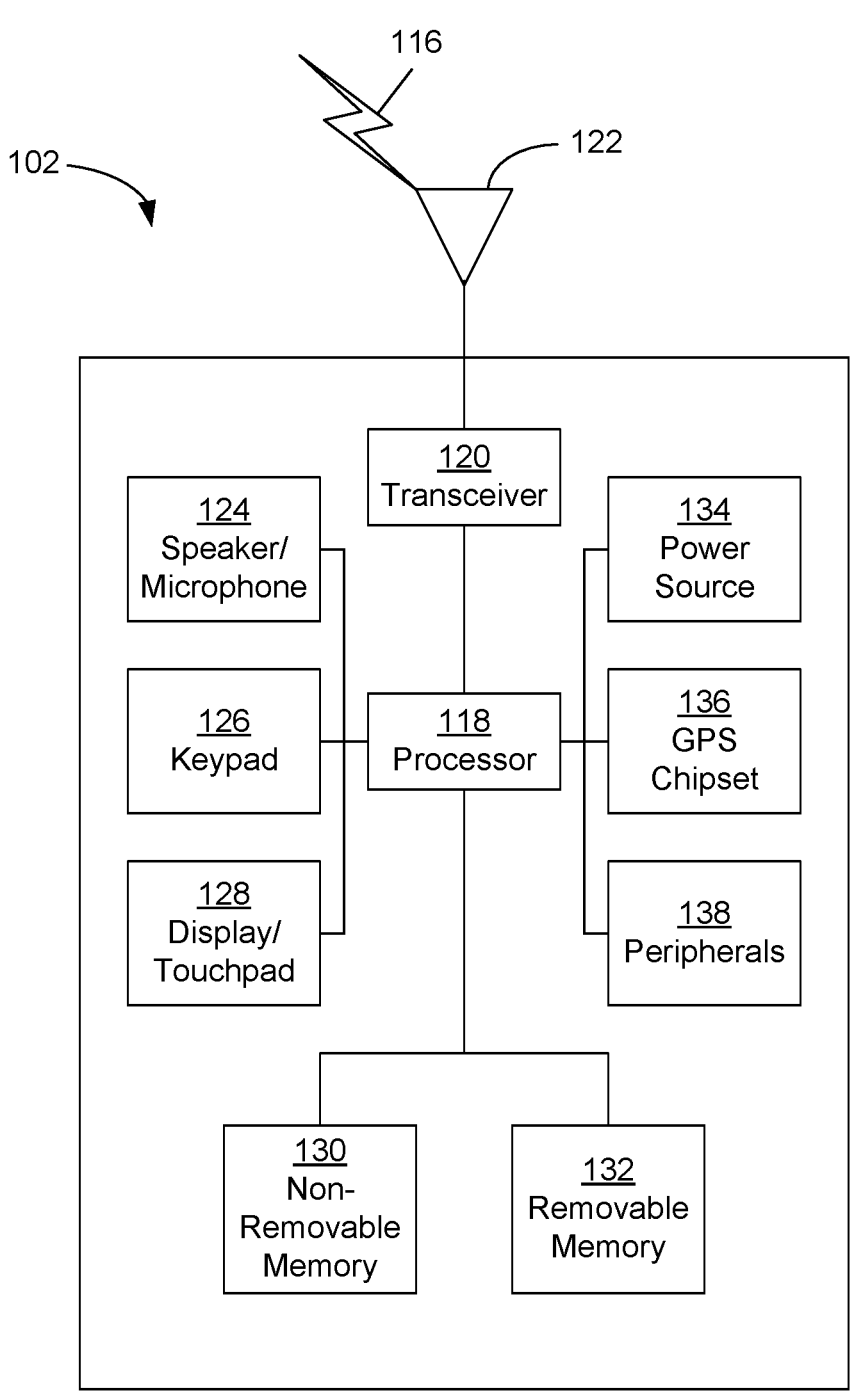
FIG. 1B is a system diagram illustrating an example wireless transmit/receive unit (WTRU) that may be used within the communications system illustrated in FIG. 1A according to an embodiment.
Figure 1C:
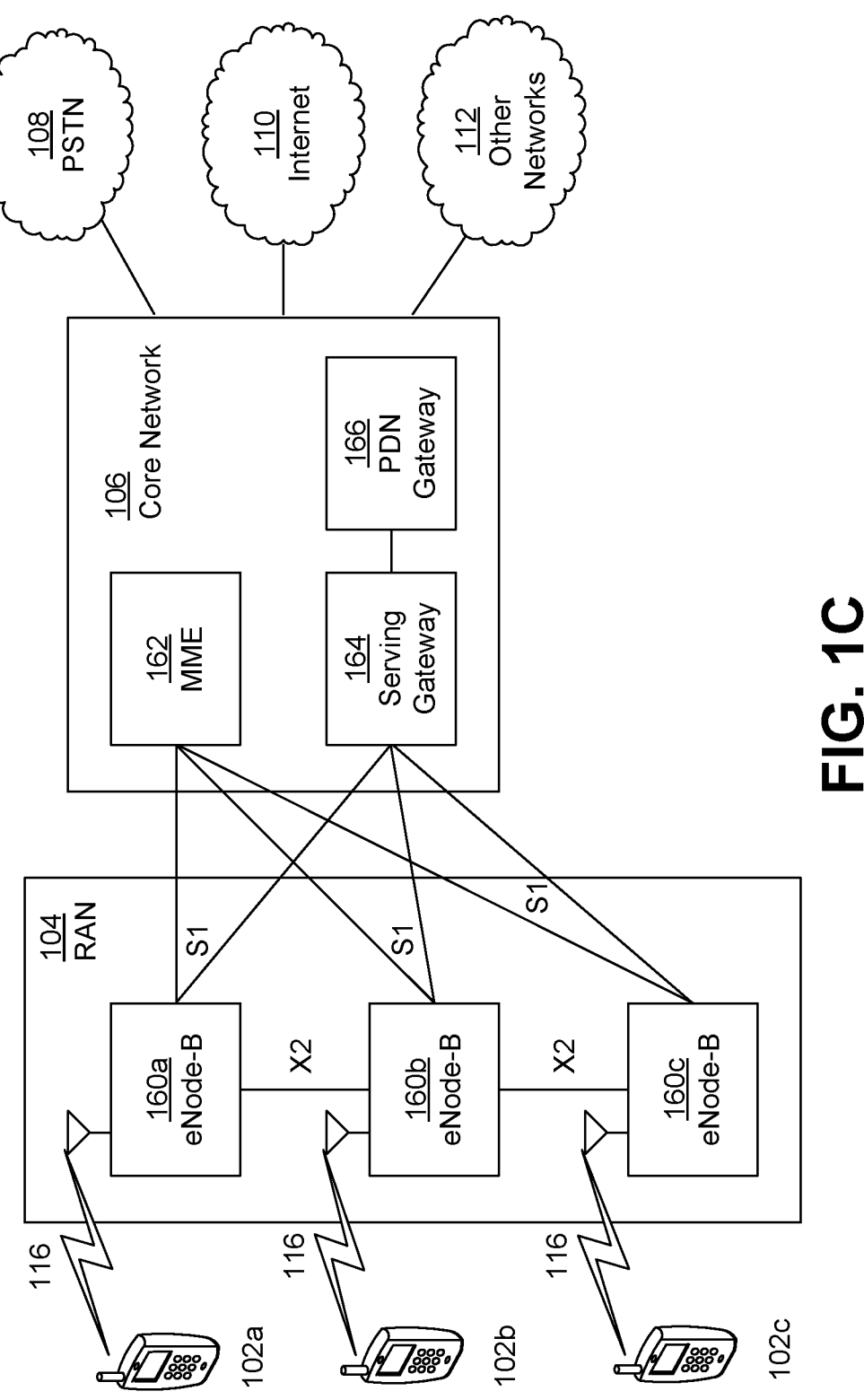
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a halfduplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a protocol data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN. A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
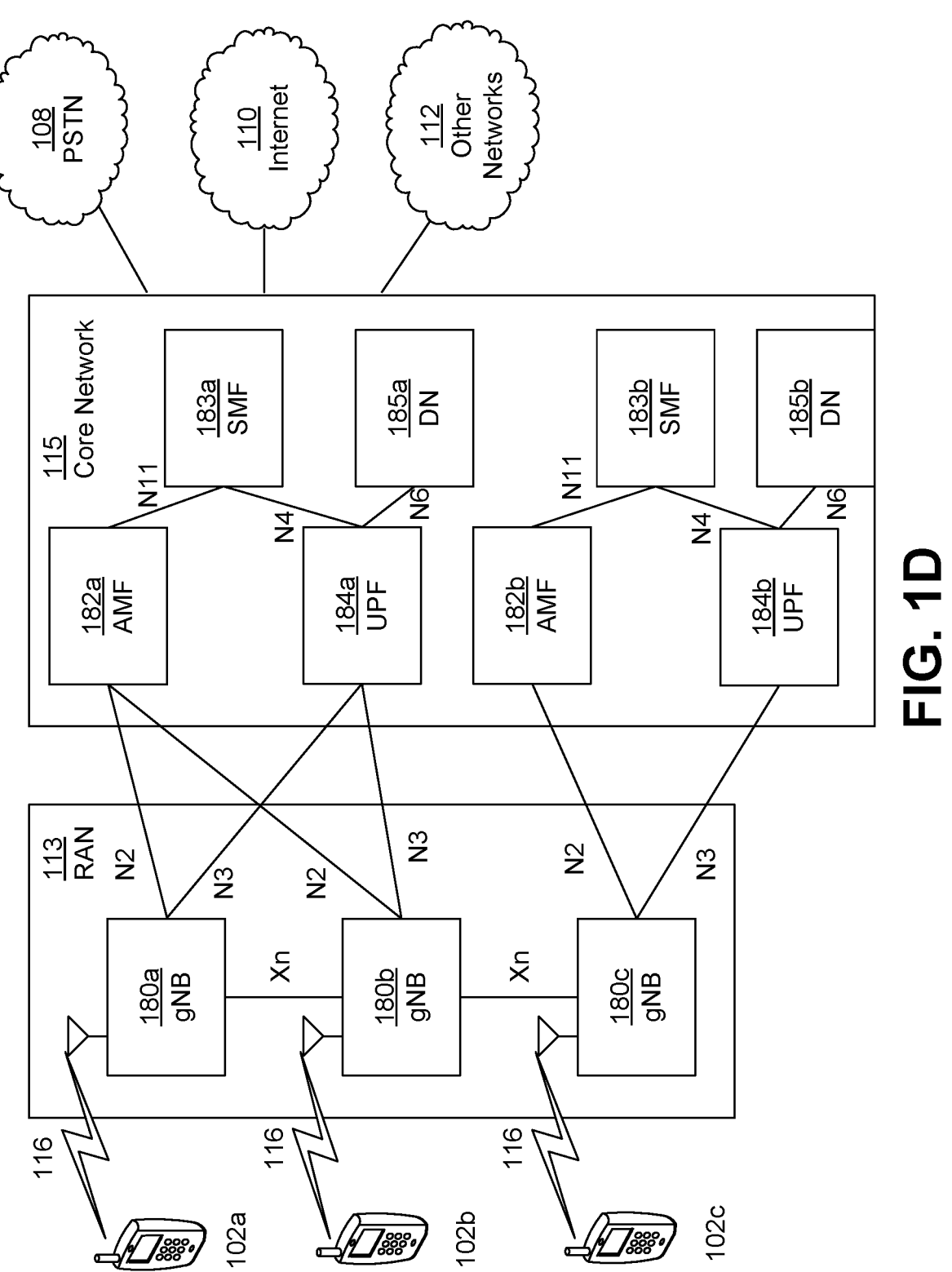
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology.

For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182*b*, 182*b* may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a*-*d*, Base Station 114*a*-*b*, eNode-B 160*a*-*c*, MME 162, SGW 164, PGW 166, gNB 180*a*-*c*, AMF 182*a*-*b*, UPF 184*a*-*b*, SMF 183*a*-*b*, DN 185*a*-*b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network.

The one or more emulation devices may perform the one or more, or all, functions while being temporarily implemented/deployed as part of a wired and/or wireless communication network. The emulation device may be directly coupled to another device for purposes of testing and/or may be performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In previous mobile communications networks, when WTRU moves from a source service area to another service area, new Protocol Data Unit (PDU) sessions often need to be established in the new service area and often the PDU session from the source service area could not be maintained. A technique is proposed to maintain the PDU session even after a new PDU session has been established, in this way realizing service continuity for the WTRU.

Figure 2:
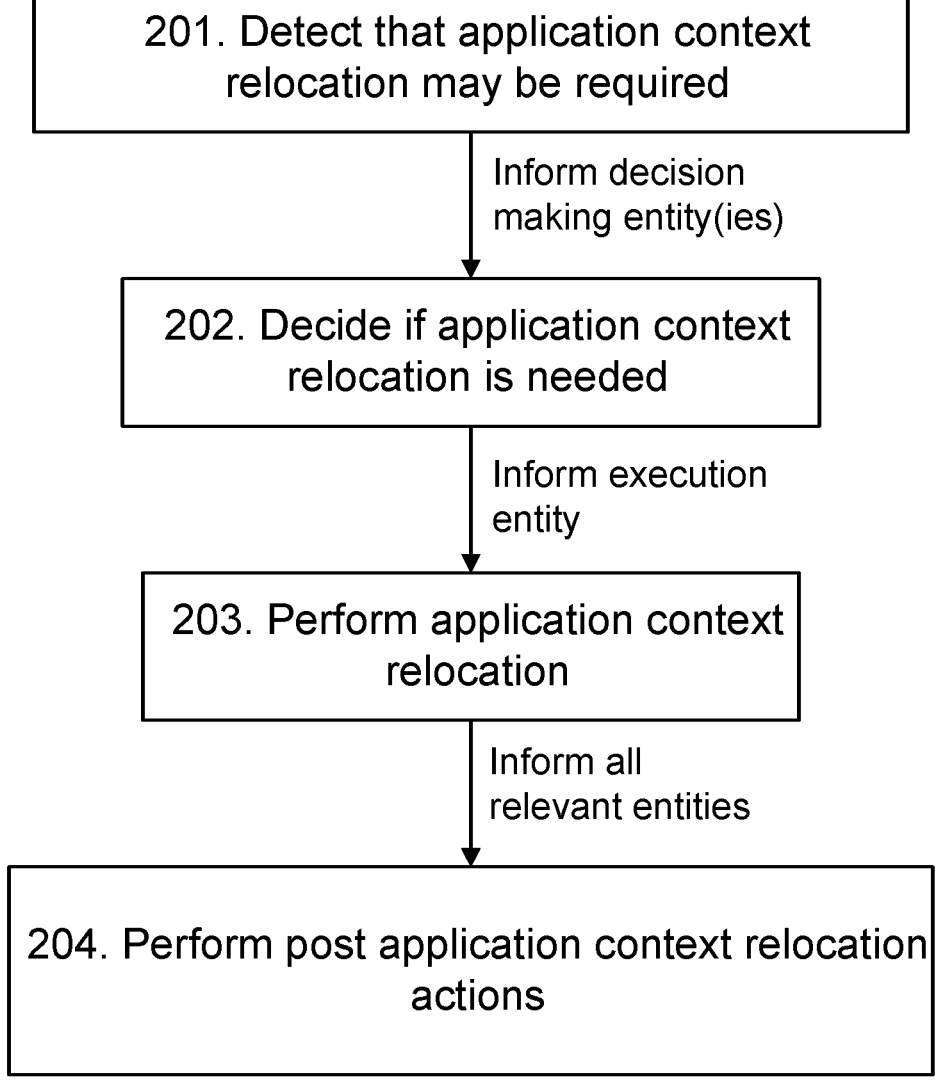
FIG. 2 is a diagram illustrating an example of Application Context Relocation high-level flow.

FIG. 2 is a diagram illustrating an example of a high-level procedure to execute Application Context Relocation (ACR). The flow shows an example procedure having four steps, with a series of events leading to the decision to relocate Application Context. In an example, application layer coordinates with the 5G system (5GS) to maintain service continuity. One or more core network nodes of the 5GS may perform the steps described in FIG. 2. In an example, the actions described with respect to FIG. 2 may be performed by an edge client, edge server, core network node supporting edge service, and/or a combination thereof. The edge devices that perform steps related to ACR may include one or more of an edge enabler client (EEC), an edge data network (EDN), an EES, a source EES (S-EES), a target (T-EES), an EAS, a source EAS (S-EAS), or a target EAS (T-EAS). The EEC may be implemented in a WTRU. The EAS and EES may be part of an edge data network that provides services to the WTRU associated with the EEC. The EES may allow for and enable discovery of the EASs that may be used for providing services. The EEC may provide edge support functions locally at the WTRU, such as, for example, support for EAS discovery to the applications in the WTRU. The ECS may, for example, provide configurations to the EEC to connect with an EAS.

In an example, a core networks node of the 5GS and/or an edge device may detect whether ACR may be required for one or more sessions (e.g., at 201 of FIG. 2). For example, the core network node(s) and/or the edge device(s) may be triggered to determine that ACR to be performed based on Edge Enabler Layer associated with the sessions. Additionally, and/or alternatively, the core network node(s) and/or the edge device(s) may determine whether ACR is to be performed based on detecting a mobility event or other WTRU change in 5G profile or configuration. For example, 202, 203, and 204 of FIG. 2 may also be performed by one or more core network nodes and/or one or more of the edge devices. For example, the core network node(s) and/or the edge device(s) may decide whether or not ACR may be needed based on observed events and/or network configuration (e.g., at 202 of FIG. 2). The core network node(s) and/or the edge device(s) may, for example, perform the context relocation (e.g., at 203 of FIG. 2). The core network node(s) and/or the edge device(s) may, for example, perform post ACR related clean-up actions (e.g., at 204 of FIG. 2).

The one or more core network nodes and/or the WTRU may be configured to interact with edge devices/nodes. For example, the EEC, EAS, EES, and/or ECS (e.g., which may be referred to herein as the Edge Enabler Layer) may provide information to and/or receive information from 5GS nodes to support the edge communication sessions. In an example, the timing of such interactions may occur between the 5GS. In an example, the Edge Enabler Layer may affect how subsequent procedures are performed. It may be desirable, for example, for 5GS connectivity to be in place and/or up to date to enable proper communication amongst Edge Enabler Layer components. In particular, for example, when mobility across data networks having different characteristics takes place, connectivity services may not be available from network to network. For example, when a WTRU and/or its corresponding EEC move from one service area to another, previous edge data network nodes (e.g., EAS, EES, ECS, ect.) may no longer be available in the new service area. In an example, a User Plane Function (UPF) may be configured to support a PDU Session for the purpose of diverting traffic. A UPF executing this function may be referred to as an Uplink Classifier (UL CL). An UL CL may be used to divert traffic for the purpose of providing the WTRU with access to localized services using a single PDU Session.

Figure 3:
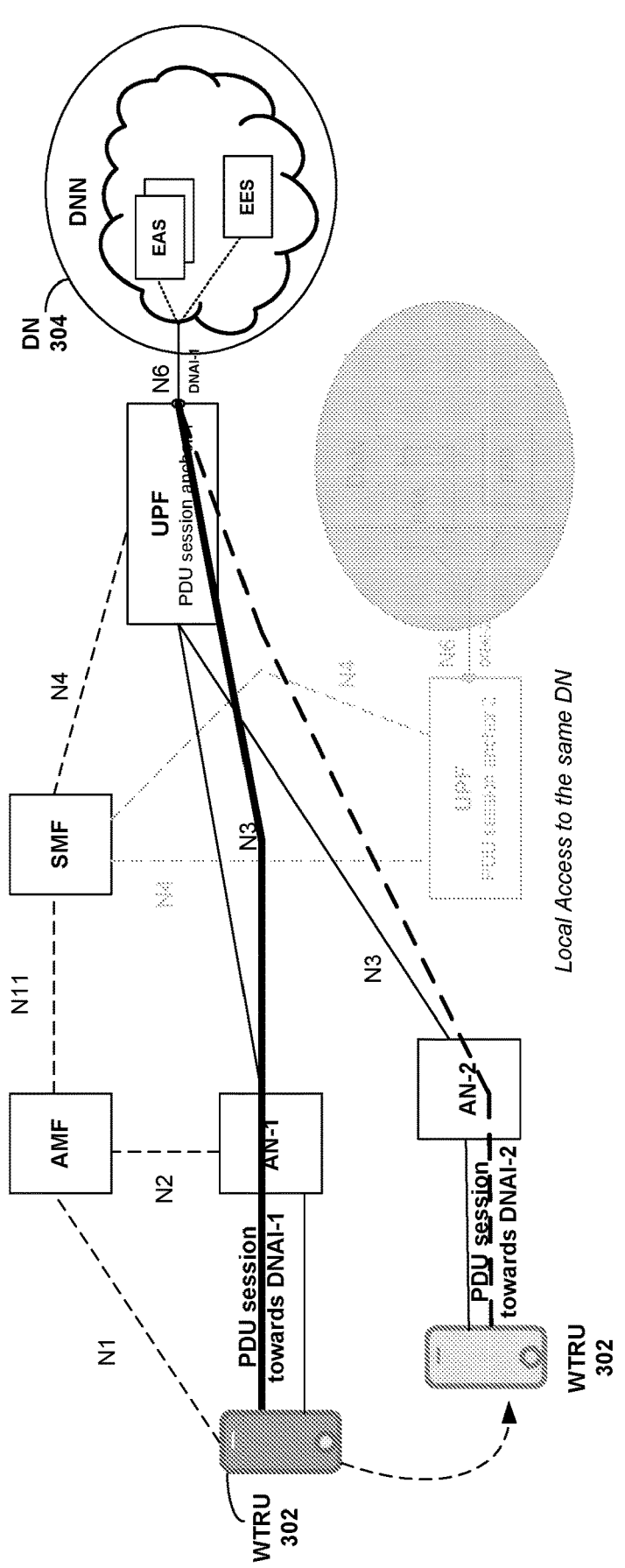
FIG. 3 is a diagram illustrating an example of continuous access to a same data network (DN) instance, identified by its data network name (DNN) after a mobility event and using a single protocol data unit (PDU) session, following a Session and Service Continuity model of Type 1.
Figure 4:
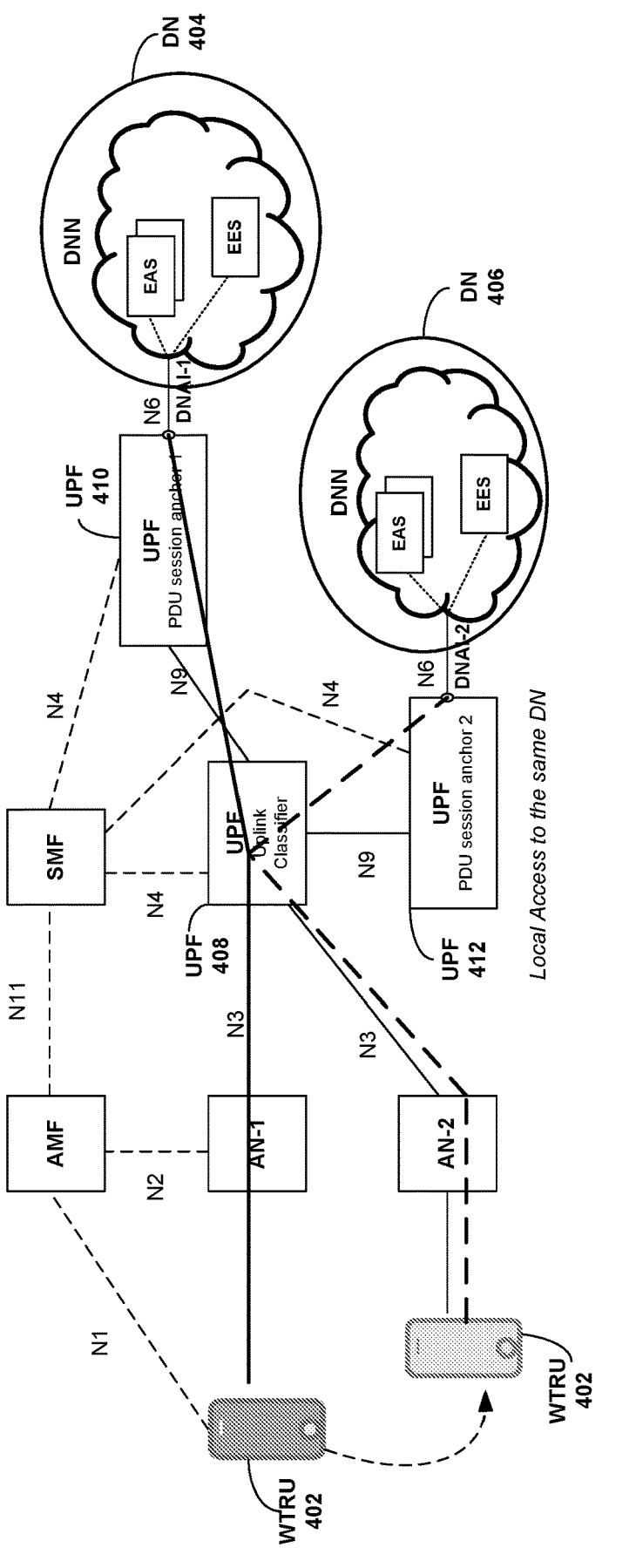
FIG. 4 is a diagram illustrating an example of continuous access to a different data network (DN), sharing a same data network name (DNN), after a mobility event using an uplink classifier (UL CL) and using a single protocol data unit (PDU) session.
Figure 5:
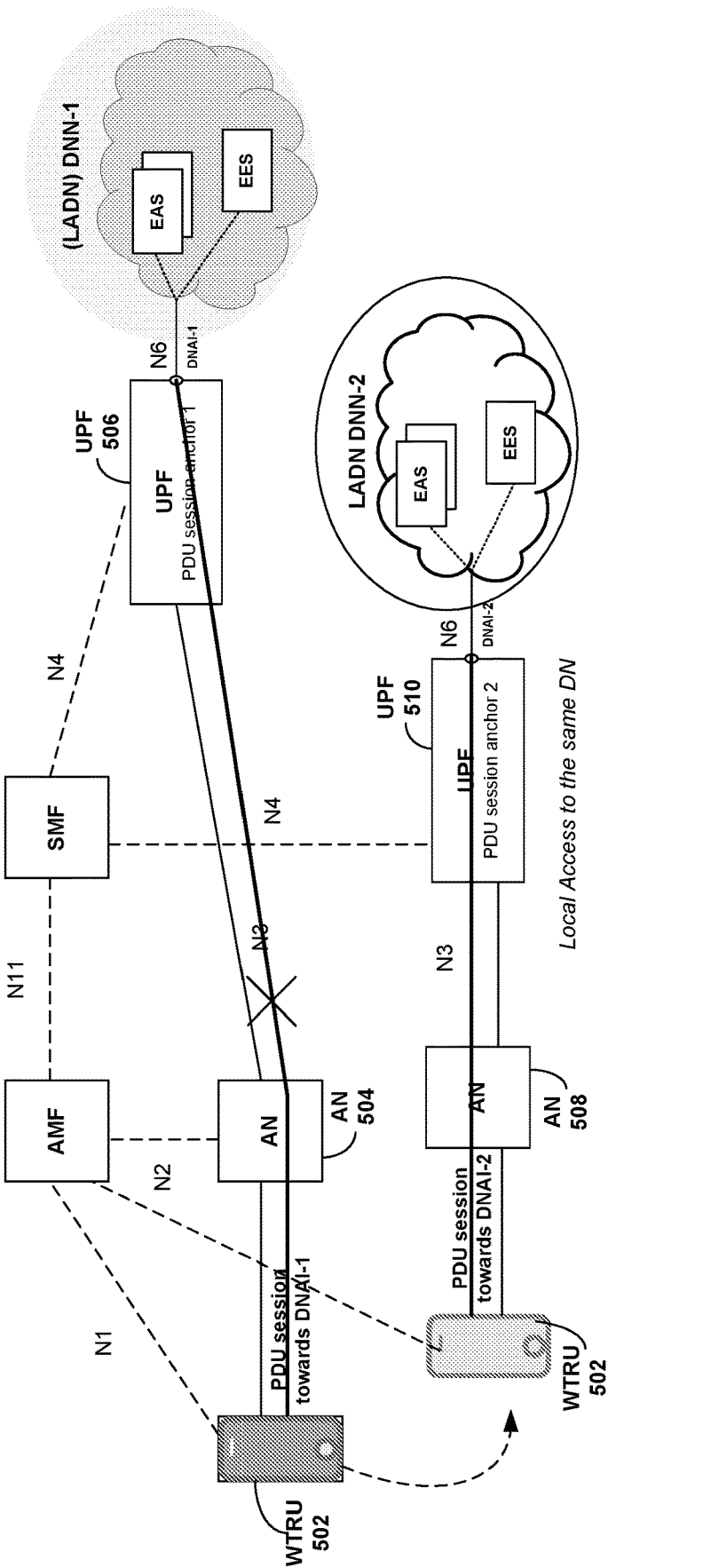
FIG. 5 is a diagram illustrating an example of continuous access to different local area data networks (LADN), each identified with their own data network name (DNN), after a mobility event using different protocol data unit (PDU) session (e.g., two protocol data unit sessions, following a Session and Service Continuity model of Type 2.

Referring generally to FIGS. 3-5, two example WTRUs are depicted. In an example, the two WTRUs represent a same WTRU 302 before and after a mobility event. FIG. 3 is a diagram illustrating an example of continuous access to a same data network (DN) instance, identified by its data network name (DNN) after a mobility event and using a single protocol data unit (PDU) session, following an example of a Session and Service Continuity model. FIG. 4 is a diagram illustrating an example of continuous access to a different data network (DN), sharing a same data network name (DNN), after a mobility event using an uplink classifier (UL CL) and using a single protocol data unit (PDU) session. For example, in FIG. 4, instances of two DNs are depicted (e.g., DN 404 and DN 406). These DNs may offer the same services and/or share the same DNN, with one being an instance closer to Access Network 1 (AN-1) and the second closer to Access Network 2 (AN-2). The DN identified by DNAI-2 (e.g., DN 406) may, for example, provide lower latency to the WTRU after mobility due to closer proximity to AN-2. As an example, in FIG. 4, a same PDU session may be maintained before and after mobility (shown as a solid line pre-mobility event, and a hashed line after mobility), enabling access to a local instance of the said data network through an UL CL (e.g., UPF 408). As shown for example, UPF 410 may act as the PDU session mobility anchor prior to the mobility event and UPF 412 may act as the PDU session mobility anchor after the mobility event.

FIG. 5 is a diagram illustrating an example of continuous access to different local area data networks (LADN), each identified with their own data network name (DNN), after a mobility event using different protocol data unit (PDU) session (e.g., two protocol data unit sessions), following a Session and Service Continuity model. FIG. 5 depicts an example of two LADN instances with different DNNs that are accessed via two different PDU sessions before and after mobility. For example, prior to the mobility event WTRU 502 accesses LADN DNN-1 via AN 504, and the PDU session mobility anchor may be UPF 506. After mobility, WTRU 502 accesses LADN DNN-2 via AN 508, and the PDU session mobility anchor may be UPF 510.

For example, as depicted in FIG. 3, a WTRU connected to data network DN (e.g., DN 304) through data network access identifier (DNAI)-1, moves to a different location under the coverage of access network (AN)-2. Initially the WTRU may continue to receive services from the DN 304, accessed through DNAI-1, using a session and service continuity (SSC) mode 1 configuration. The System may be aware that a local instance of the DN is available and the same services may be rendered by this DN instance. In an example the same services may be rendered by this DN instance with reduced latency. For example, in order to access the same services from the local DN instance (e.g., DN 406 after mobility as depicted in FIG. 4), the System (e.g., the SMF) may insert a UL CL (e.g, UPF 408) in the data path leading to Data Network Access Identifier-1 (DNAI-1), for the purpose of diverting traffic to the closest DN (DNAI-2), which may be able to provide the same services with reduced latency.

In an example, the WTRU may use the same PDU Session both before and after the mobility event. Furthermore, for example, although the WTRU may not be aware that an UL CL is being inserted in the data path, the WTRU nevertheless may remain connected to the Edge Enabled Server (EES) and Edge Application Server (EAS) from the DN instances in different locations to be able to complete the Application Context Relocation. In an example, the WTRU may have the capability to use the same PDU Session to access the DNN in both locations, since the WTRU may be accessing the same DNN after the mobility event. The WTRU may, for example, be accessing the same DNN after the mobiliy event locally. This capability may enable the WTRU to remain connected to the source DN (e.g., S-EAS/S-ESS) and target DN (e.g., T-EAS/T-EES) during the mobility event.

FIGS. 3 and 4 illustrate examples of a mobility event when the same PDU Session may be maintained. In an example, it may be possible to access DNNs over different PDU Sessions to avail of the same services. FIG. 5 depicts an example of a case where different DNs are accessed through separate PDU Sessions after a mobility event. In an example, the target DNN may be a Local Area Data Network (LADN) DNN and the source DNN may or may not be an LADN DNN. In an example, a LADN DNN may restrict access to certain services to certain geographical areas or service areas. For example, when the WTRU moves away from the Service Area of the source LADN, the PDU Session at the source (LADN) DNN be deactivated and/or released. The PDU Session may be re-established and/or reactivated in the target Service Area, as illustrated as an example in FIG. 5.

In an example scenario, a new PDU session that is to be in the new service area may affect the establishment of data connectivity towards Edge Enabler Layer entities during an Application Context Relocation procedure. In the example scenario, there may be numerous entities and/or procedures to be considered (e.g., application context transfer (ACT), application client (AC), edge enabler client (EEC), edge data network (EDN), EES, source EES (S-EES), target (T-EES), EAS, source EAS (S_EAS), and target EAS (T-EAS)). Upon selecting T-EES, for example, the WTRU may need to establish a new PDU connection to the target EDN. The EEC may then, for example, discover and select T-EAS by performing EAS Discovery with the T-EES.

Figure 6:
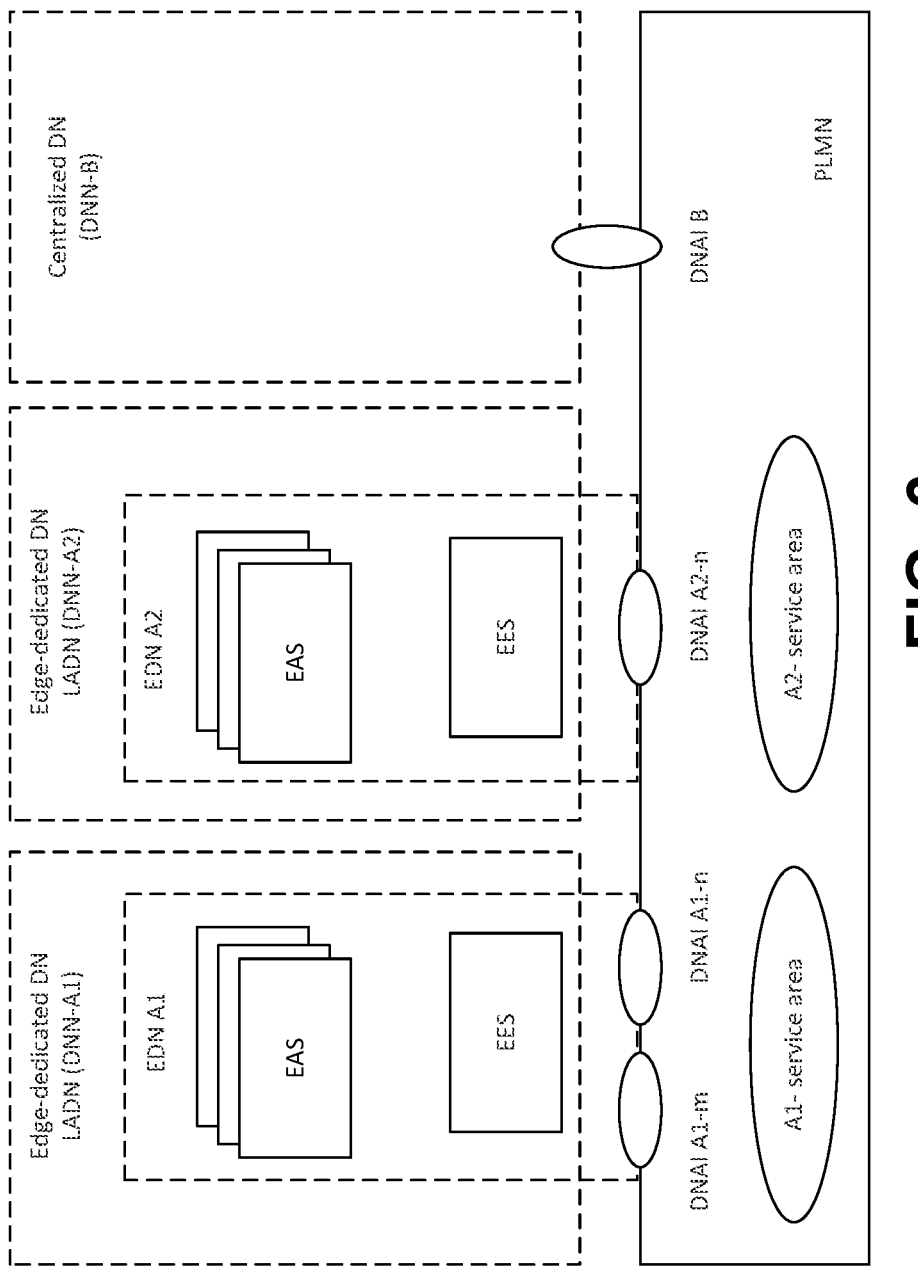
FIG. 6 is a diagram illustrating an example of how a Local Access Data Network may be accessed through its associated Service Area (e.g., A1 Service Area and A2 Service Area)

In an example, when the AC (e.g., at the WTRU) is triggered by the EEC to start ACT (Application Context Transfer), the AC may initiate the transfer of application context from the S-EAS to the T-EAS. There may be different ways of transferring context. In an example, after the ACR is completed, the AC may remain connected to the T-EAS and disconnect from the S-EAS. The EEC may be informed of the completion. In an example, for the duration of the ACR procedure, connectivity to both S-EAS/S-EES and T-EAS/T-EES may be maintained to allow the AC to complete the ACT procedure. FIG. 6 illustrates an example of providing access to different Edge-dedicated DN (e.g., LADN (DNN-A1) and LAD (DNN-A2)) via different local networks corresponding to different service areas (e.g., A1-service area, and A2-service area, respectively).

There are multiple example scenarios wherein the ACR procedure could be executed. For example, a scenario may include initiation by EEC using EAS Discovery. For example, a scenario may include EEC executed ACR via S-EES. For example, a scenario may include S-EAS decided ACR. For example, a scenario may include S-EES executed ACR. For example, a scenario may include EEC executed ACR via T-EES. In an example wherein ACR is initiated by EEC using EAS discovery, access to LADN from different LADNs and/or DNNs (not LADNs) using a single PDU Session may be obtained. For example, access to the target LADN DNN may be obtained via techniques that use a UL CL and separate PDU Sessions. In an example, a single PDU Session may be established. In an example, the WTRU may trigger a separate PDU Session as illustrated in FIG. 5. As an example, prior to the mobility event, the WTRU may acquire data connectivity over a PDU Session to gain access to an LADN DNN, through DNAI-1, as depicted, for example, in FIGS. 7 and 8.

Figure 7:
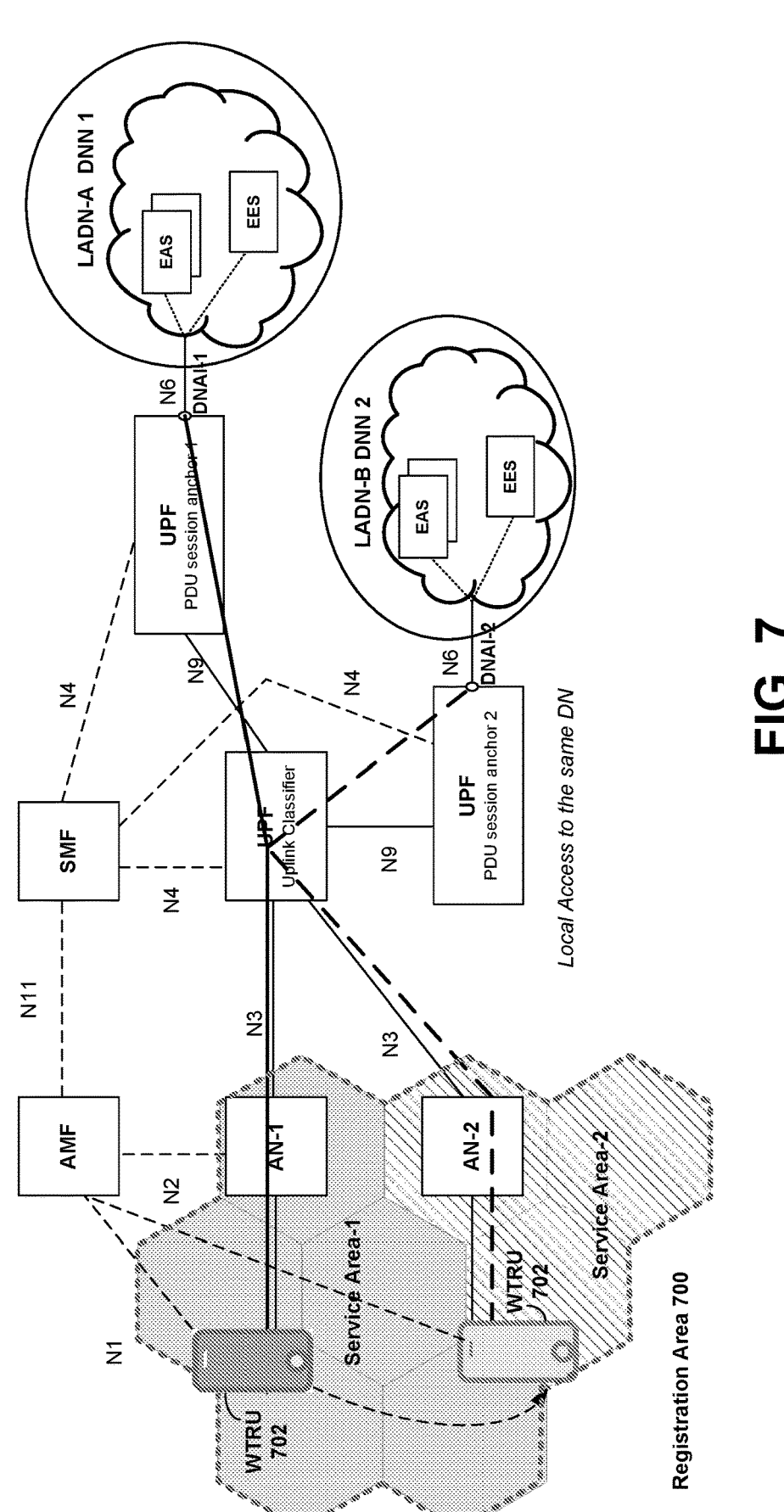
FIG. 7 is a diagram illustrating an example of continuous access to a local area data network (LADN) DNN, over a single PDU Session, using an UL CL according to an embodiment.

FIG. 7 is a diagram illustrating an example of continuous access to a local area data network (LADN) DNN, over a single PDU Session, using an UL CL according to an embodiment. As an example, when the WTRU 702 moves across the Registration Area 700, the WTRU may cross over multiple LADN Service Areas. For example, the WTRU may move from Service Area-1 into Service Area-2. In an example scenario involving a WTRU moving from a Service Area of a LADN (LADN-A DNN-1) into a service Area of a different LADN (e.g., LADN-B DNN-2), wherein the PDU Sessions with both LADNs may be unable to be kept active, the WTRU may perform various actions in order to ensure service continuity during the Registration Request message.

In an embodiment, the WTRU may include information whether the target LADN DNN is equivalent to others in a list of one or more pieces of information configured in the WTRU in the registration message. For example, the LADN DNN entry in the registration message may include a list of equivalent LADN DNNs and/or an indication of whether a T-LADN DNN is equivalent to a previous S-LADN DNN. The WTRU may provide this list to the system during a registration procedure. The AMF may accept a subset of this list or it might provide a different list. The list that the AMF provides, which may or may not match the list of the WTRU, may be stored in the subscriber record in the unified data management (UDM). In an example, upon receiving at least part of the list from the WTRU, the AMF may pass this information to the SMF during the PDU Session Establishment or PDU Session Update Context Procedure. In an example, this information may indicate to the SMF not to release and/or deactivate PDU Sessions in the Source LADN DNN, while the ACR procedure is ongoing, when the Source and the Target LADN DNNs are identified as "Equivalent". In an example, an equivalent LADN may be characterized as one that delivers the same services to the AC, supports the same set of EAS, temporarily extends the Service Area of the Source LADN for the duration of the ACR procedure, and/or maps to the same application function (AF) Service Identifier.

During an example of a PDU Session Establishment procedure, the WTRU and/or network nodes may take into account a change in LADN DNN in order to ensure service continuity is maintained. According to an example, the AMF provides the SMF with the information received during the Registration procedure, regarding LADN DNN, including mappings of LADN DNNs to equivalent LADN DNNs or LADN DNNs associated with an AF-Service Identifier. The AMF may map the Application ID provided by the WTRU to an AF-Service Identifier, and/or the policy control function (PCF) may provide this mapping to the AMF during the AM Policy Associating. According to an example, the WTRU provides to the SMF an indication of what LADN DNNs are equivalent and/or which Application IDs are associated with which LADN DNNs. The indication from the WTRU may indicate to the network that previous PDU sessions should remain active during a ACR procedure when a PDU session is being established for an equivalent LADN DNN, for example due to a mobility event.

In an example, during the addition of a new PDU Session towards a LADN DNN, the SMF may keep the PDU Session active in the Source LADN DNN for the duration of the ongoing ACR procedure. In an example, LADN DNN information and/or information regarding which LADN DNNs are equivalent may be defined in the subscriber record in the UDM. In an example, the AMF may fetch this information upon registration. In an example, the WTRU may explicitly indicate that a previously PDU session should be maintained during an ACR procedure. For example, the WTRU may indicate (for example, may explicated indicate) that the previous PDU session should be maintained during the ACR procedure using a new parameter in the Registration Request message, such as a PDU session establishment request. For example, the parameter may indicate a request for one or more PDU Sessions Release and/or Deactivation be delayed and/or suspended while there is an ongoing ACR procedure. In an example, the parameter may be an ACR Service Continuity Flag. In an example, a ACR Service Continuity Flag may indicate that the previous PDU session should be maintained until the ACR procedure is complete. In an example, a PDU Session may be deactivated after the WTRU leaves the Service Area of a LADN. In an example, upon receiving an indication from the WTRU with one or more parameters that indicate that the release of the previous PDU session should be suspended and/or delayed, the network may maintain the current and/or previous PDU session after the WTRU leaves the service area. In an example, the WTRU may request a new PDU Session when entering a new Service Area which results in two PDU Sessions (the original one and/or the new one). In an example, the UE may indicate for which LADNs it wants to Suspend the Release and/or Deactivation, for example when creating the new PDU session.

In an embodiment, the WTRU may provide information correlating the LADN DNN to an application ID. For example, the WTRU may provide information from the WTRU route selection policy (URSP) rules, such as traffic descriptors, associating an App Id (e.g., Operating System Interface Definition (OSId), Operating System Specific Application Identifier (OSAppId)) to an LADN DNN. The association of LADN DNN to application ID may be used by the SMF to associate a LADN DNN with an AF-Service Identifier and/or to the DNAI used to access the LADN DNN. In an example, the Nsmf_EventExposure service may allow network functions (NFs) to subscribe and get notified about events related to PDU sessions. The Nsmf_EventExposure service may have service operations such as Nsmf_EventExposure_Subscribe, Nsmf_EventExposure_Unsubscribe and/or Nsmf_EventExposure_Notify. The SMF may expose information about PDU session related events to various other devices using these service operations. For example, the SMF may provide information related to the WTRU IP address or Prefix change, PDU Session Release, user place (UP) path change, change of Access Type, PLMN change, and/or the like. In an example, as a result of a Nsmf_EventExposure_Notify service operation, the AF may provide the expected duration of the ACR procedure to API endpoints (e.g., through an explicit Nnef_TrafficInfluence Create service operation, through a Nnef_TrafficInfluence_AppRelocation/NsmfEventExposure_AppRelocationInfo, and/or a like operation). In an example, alternatively and/or in addition, the AF may provide the AF-Service Identifier/DNAI ID combinations that may be used to determine whether any active PDU Sessions in the Source LADN DNN should be kept for the duration of the ACR procedure, using the expected duration of the ACR procedure provided according to the options described above.

In an example, the embodiments described herein may address scenarios that may involve a WTRU moving from a Service Area of a LADN (LADN DNN-1) into a service Area of a different LADN (e.g, LADN DNN-2). During such a move, the WTRU may be unable to keep active PDU Sessions with both LADNs, at least on a long-term basis. For example, during the addition of a PDU Session Anchor and a UL CL, the SMF may use the information provided by the WTRU to determine whether the PDU Session connecting the Source LADN DNN should be kept active and how long the PDU Session connecting the Source LADN should be kept active.

Figure 8:
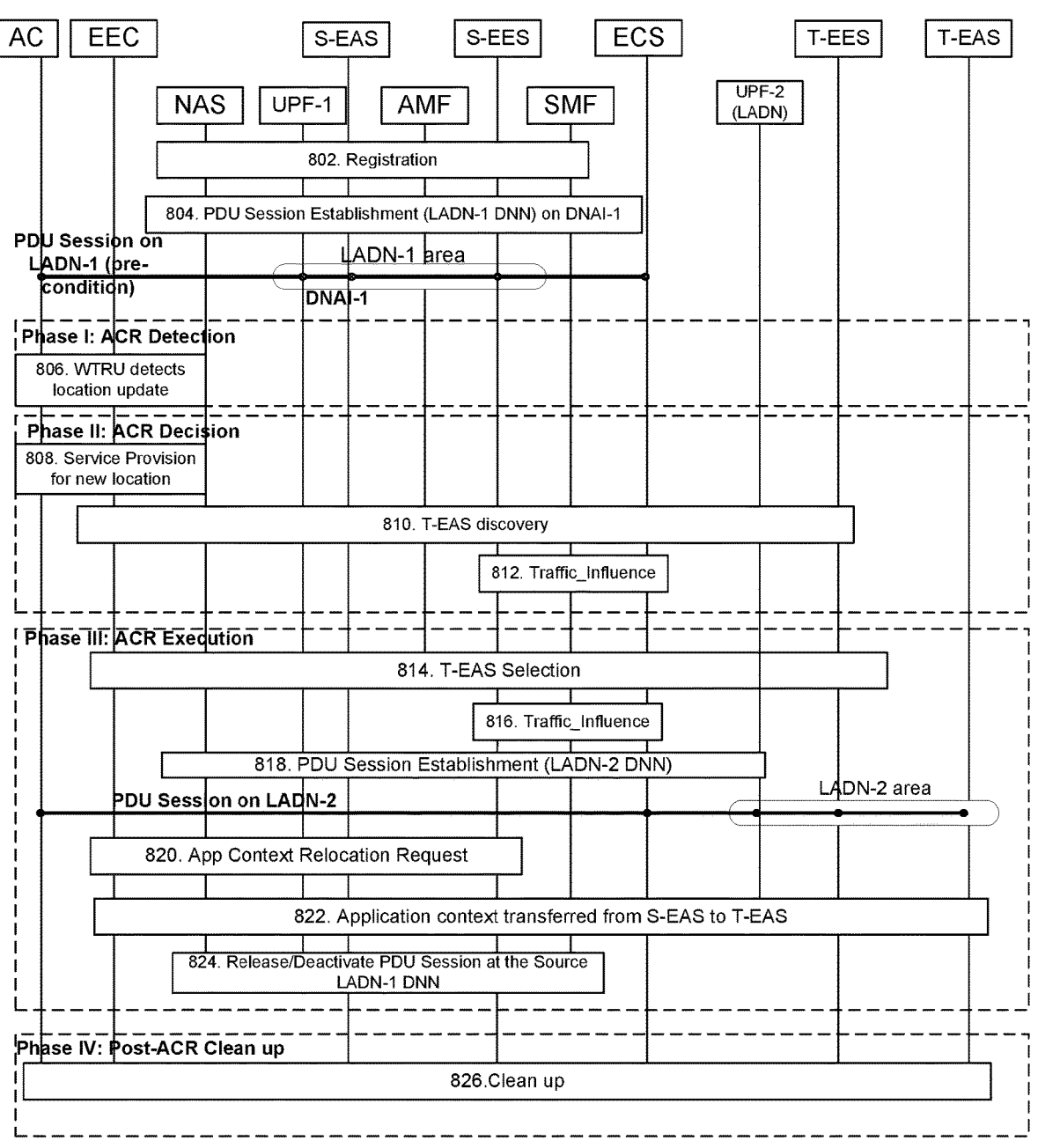
FIG. 8 is a diagram illustrating an example of access to a Local Network using multiple PDU sessions according to an embodiment.

FIG. 8 is a diagram illustrating an example of access to a Local Network using multiple PDU sessions according to an embodiment. As an example, two pre-conditions are caused to exist in the scenario in which the target LADN DNN may be accessed through two PDU sessions. Note that this scenario may also work with a single PDU session, in which case the target LADN may be accessed through an UL CL. The application client (AC), which along with the EEC may be located at the WTRU, communicates with the EAS over an existing PDU session. The EEC may be subscribed to ECS updates for the PDU session. In an example, the procedures illustrated herein may refer to a single AC and/or may be extended to multiple ACs. In an example, the procedures illustrated herein may refer to multiple LADN DNN/Application ID/DNAI combinations. At 802, for example, the WTRU may register to the mobile network. At 804, for example, the WTRU may establishe a PDU session, using PDU Session ID-1 and LADN-1 DNN, to connect to DNAI-1 to access services. In an example, once connectivity is established, the AC in the WTRU may establish a connection to a corresponding S-EAS. In an example, the EEC may be triggered when it obtains the WTRU's new location and/or may be triggered by another entity such as an edge configuration server (ECS) notification.

In an example, the disclosed procedures to enable service continuity may relate to four phases, comprising an ACR detection phase, an ACR decision phase, an ACR execution phase, and a post-ACR clean up phase. For example, regarding the ACR detection phase, the WTRU may provide, in the Registration Request message, an indication of what LADN DNN are equivalent and/or what Application IDs are associated to what LADN DNN and/or whether PDU Session Release and/or Deactivation Suspension should be conducted for the duration of the ACR procedure. In an example, the registration request message may be a NAS message. In an example, the registration request message may be a PDU session establishment message. In an example, the SMF may provide this information to the SMF in the PDU Session Update Context Procedure.

During the PDU Session Establishment procedure, the WTRU may indicate that session continuity should be maintained, for example by indicating PDU sessions that should remain active while an ACR is completed. According to an example, the AMF may provide the SMF with the information received regarding LADN DNN, including mappings of LADN DNNs to equivalent LADN DNNs or LADN DNN associated with a AF-Service Identifier. The AMF may map the Application ID provided by the WTRU to an AF-Service Identifier, and/or the PCF may provide this mapping to the AMF during the AM Policy Associating. According to an example, the WTRU may provide to the SMF an indication of which LADN DNNs are equivalents or which Application IDs are associated with which LADN DNN. The WTRU may provide to the AMF an indication of whether PDU Session Release and/or Deactivation Suspension should be conducted to provide Service Continuity for the duration of the ACR procedure.

In an example, the procedures of the ACR detection phase may continue with triggering, for example at 806, of the EEC as a result of a WTRU mobility event. For example, the EEC of the WTRU may be provided with the WTRU's new location. In an example, if the EEC is triggered by an external entity such as by a notification from the ECS, a list of new EESs (to be used as T-EESs) may be provided by that notification. In an example, if the T-EES are known based on ACR Detection, the first portion of the procedures in the ACR decision phase described herein (e.g., at 808) may be skipped. In an example, regarding the ACR decision phase, the first portion of the ACR decision phase procedures may entail the EEC performing, for example at 808, Service Provisioning for active applications that are subject to ACR. In an example, when the location of the WTRU has changed, this procedure may result in a list of one or more T-EESs that are relevant to the supplied applications and/or the new location of the WTRU. In an example, if this procedure is used for service continuity planning, then the Connectivity information and/or WTRU Location in the Service Provisioning procedure may contain the expected Connectivity information and/or expected WTRU Location. In an example, if the EEC of the WTRU may determine which applications require ACR. The decision regarding which applications require ACR may be based on the application profile, such as requirement of service continuity of the application. In an example, if the change in the WTRU's location does not trigger a need to change the serving EAS, the subsequent procedures may be skipped. In such a scenario, the EEC may remain connected to the serving EESs and the ACs may remain connected to their corresponding serving EASs.

In an example, a second portion of the ACR decision phase procedures may entail using the provisioned T-EESs, by the EEC at 810, to perform EAS for the desired T-EASs by querying the T-EESs that were established in the first portion of the procedures (or provided in the notification from the ECS—if it was the trigger). In an example, the second portion of the ACR decision phase procedures may include the S-EES using EEC EAS discovery request procedure at 812. In an example, the S-EES may use the request to trigger the Traffic_Influence procedure and provide the SMF/network exposure function (NEF) with information on target LADN DNN as part of the N6 Traffic Routing information corresponding to the target DNAI. In an example, the provided information may include information about Equivalent LADN DNN or mappings of LADN DNN to AF-Service IDs.

Regarding the ACR Execution phase, a first portion of the procedures performed in this phase may involve the AC and EEC selecting, for example at 814, the T-EAS to be used for the application traffic after the mobility event. The first portion of the procedures may be skipped if EEC selects a single T-EAS. In an example, at 818, the WTRU may invoke a PDU Session Establishment procedure to connect towards DNAI-2, for example by sending a PDU session establishment request message. The PDU Session Establishment procedure may be invoked based on the mobility event and/or the detection that the WTRU has left the old LADN DNN Service Area and/or the detection that the WTRU has entered a new LADN DNN Service Area. The WTRU may indicate the Old PDU Session and the Old LADN DNN, which tells the SMF that the Old PDU Session associated with the Old LADN should remain active. The indication may be that it should remain active for the duration of the ACR timer, until traffic is no longer detected in the Old PDU Session, and/or until the ACR procedure has been completed. The SMF may notify the S-EES about a mobility event. In response, the S-EES may provide the SMF and/or NEF with aspects of the ACR procedure, including information on equivalent LADN DNN and/or LADN DNN(s) associated with the same AF-Service identifier. The S-EES may provide the expected time the PDU Session at the Source LADN DNN should be active. In an example, the expected time the PDU Session at the Source LADN DNN should be active may correspond roughly to the duration of the ACR procedure. Additionally or alternatively, the SMF may determine, using the existing N4 Session Report and/or Ack procedure on the Source PDU Session, traffic still flowing on this PDU Session. In an example, the timer provided by the S-EES may indicate how long the SMF should keep the PDU Session on the Source LADN DNN once traffic is no longer detected.

According to a second portion of the ACR execution phase procedures, the EEC may, for example at 820, send the ACR Request message to the S-EES. The ACR request message may be sent without notifying, and/or without indicating the need to notify, the EAS. The S-EES may apply the AF traffic influence with the N6 routing information of the T-EAS in the 3GPP Core Network (if applicable).

According to a third portion of the ACR execution procedures, the AC may be triggered, 822, by the EEC to start ACT. In an example, the AC may decide to initiate the transfer of application context from the S-EAS to the T-EAS. In an example, there may be different ways of transferring context. After the ACR is completed, the AC may remain connected to the T-EAS and disconnects from the S-EAS; the EEC is informed of the completion. Upon PDU Session Release and/or Deactivation notification provided by lower layers, the EEC may provide an indication to the AC that the S-EAS is no longer available. At step 6a, for example, the SMF may use the ACR procedure duration timer, and/or the alternative traffic detection timer, to determine when to release and/or deactivate the pending PDU Session connecting the WTRU to the Source LADN DNN (LADN-1 DNN). In an example, the AC may initiate the ACT and inform the source and T-EAS that state transfer was part of service continuity planning. When used for service continuity planning, the Post-ACR Clean up phase may be performed, for example at step 7, after the WTRU moves to the predicted location. In this final phase, all required entities may perform a clean-up procedure.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that may cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. The representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples.

Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element may be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1E, 2 and 3.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that may cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶ 6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A Wireless Transmit/Receive Unit (WTRU) comprising a processor and memory, the processor and memory configured to:

establish a first protocol data unit (PDU) session associated with at least a local area data network (LADN) data network name (DNN), the LADN DNN being associated with a first service area;

detect that the WTRU re-located to a second service area, wherein the second service area is not supported by the LADN DNN;

send a request to establish a second PDU session associated with at least a DNN, wherein the request to establish the second PDU session indicates that the first PDU session should remain active during an application context relocation (ACR) procedure; and utilize the first PDU session associated with the LADN DNN while operating in the second service area; and release or deactivate the first PDU session after the second PDU session has been established.

2. The WTRU of claim 1, wherein the DNN associated with the second PDU session is an LADN DNN associated with the second PDU session.

3. The WTRU of claim 1, wherein the processor and memory are further configured to utilize the second PDU session associated with the DNN after the first PDU session has been released.

4. The WTRU of claim 1, wherein the DNN is configured as an equivalent DNN to the LADN DNN.

5. The WTRU of claim 1, wherein the processor and memory are further configured to indicate in a registration request message whether the DNN is configured as an equivalent DNN to the LADN DNN.

6. The WTRU of claim 1, wherein the processor and memory are further configured to provide information relating to equivalent DNNs or identification information associated with equivalent DNNs to a Session Management Function (SMF).

7. The WTRU of claim 1, wherein the processor and memory are further configured to release or deactivate the first PDU session based on expiration of a timer.

8. The WTRU of claim 1, wherein the processor and memory are further configured to:

receive information indicating that the ACR procedure has been completed; and release or deactivate the first PDU session based on the received information indicating that the ACR procedure has been completed.

9. The WTRU of claim 1, wherein the first PDU session is released or deactivated at a time based on information regarding a duration of the ACR procedure or traffic on the first PDU session.

10. The WTRU of claim 1, wherein the processor and memory are further configured to determine that the first PDU session associated with the LADN DNN requires service continuity based on an Edge Configuration Server (ECS) notification.

11. A method of providing service continuity at a Wireless Transmit/Receive Unit (WTRU), the method comprising:

establishing, via the WTRU, a first protocol data unit (PDU) session associated with at least a local area data network (LADN) data network name (DNN), the LADN DNN being associated with a first service area;

detecting, via the WTRU, that the WTRU re-located to a second service area, wherein the second service area is not supported by the LADN DNN;

sending, via the WTRU, a request to establish a second PDU session associated with at least a DNN, the DNN being associated with the second service area, wherein the request to establish the second PDU session indicates that the first PDU session should remain active during an application context relocation (ACR) procedure; and utilizing the first PDU session associated with the LADN DNN while operating in the second service area; and releasing or deactivating the first PDU session after the second PDU session has been established.

12. The method of claim 11, wherein the DNN associated with the second PDU session is an LADN DNN associated with the second PDU session.

13. The method of claim 11, further comprising utilizing the second PDU session associated with the DNN after the first PDU session has been released.

14. The method of claim 11, wherein the DNN is configured as an equivalent DNN to the LADN DNN.

15. The method of claim 11, further comprising indicating in a registration request message whether the DNN is configured as an equivalent DNN to the LADN DNN.

16. The method of claim 11, further comprising providing information relating to equivalent DNNs or identification information associated with equivalent DNNs to a Session Management Function (SMF).

17. The method of claim 11, further comprising releasing or deactivating the first PDU session on expiration of a timer.

18. The method of claim 11, further comprising receiving information that indicates the ACR procedure has been completed, and releasing or deactivating the first PDU session based on the receiving of the information that indicates the ACR procedure has been completed.

19. The method of claim 11, further comprising releasing or deactivating the first PDU session at a time based on information regarding a duration of the ACR procedure or traffic on the first PDU session.

20. The method of claim 11, further comprising determining that the first PDU session associated with the LADN DNN requires service continuity based on an Edge Configuration Server (ECS) notification.

* * * * *